(12) United States Patent
Blackketter et al.

(10) Patent No.: US 7,197,758 B1
(45) Date of Patent: Mar. 27, 2007

(54) METHOD AND APPARATUS FOR INDEXING VIDEO PROGRAMS

(75) Inventors: Dean J. Blackketter, San Francisco, CA (US); Timothy F. Park, Menlo Park, CA (US); Daniel J. Zigmond, Menlo Park, CA (US); John R. Matheny, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/561,390

(22) Filed: Apr. 27, 2000

(51) Int. Cl.
*H04N 5/445* (2006.01)
*H04N 5/00* (2006.01)
*H04N 7/173* (2006.01)
*G06F 13/00* (2006.01)
*G06F 3/00* (2006.01)

(52) U.S. Cl. .................... 725/37; 725/38; 725/93; 725/116; 386/125

(58) Field of Classification Search ............ 725/37–61, 725/93, 116; 386/86, 125
See application file for complete search history.

(56) References Cited

U.S. PATENT DOCUMENTS

| | | | |
|---|---|---|---|
| 5,189,630 A | | 2/1993 | Barstow et al. |
| 5,488,409 A | * | 1/1996 | Yuen et al. .................... 725/41 |
| 5,526,479 A | | 6/1996 | Barstow et al. |
| 5,614,940 A | | 3/1997 | Cobbley et al. ............... 348/7 |
| 5,671,347 A | | 9/1997 | Barstow et al. |
| 5,818,510 A | | 10/1998 | Cobbley et al. ............... 348/7 |
| 5,923,627 A | * | 7/1999 | Miwa et al. ................... 386/70 |
| 6,204,862 B1 | | 3/2001 | Barstow et al. |
| 6,260,194 B1 | * | 7/2001 | Shiels et al. ................ 725/134 |
| 6,304,715 B1 | * | 10/2001 | Abecassis ..................... 386/68 |
| 6,519,009 B1 | * | 2/2003 | Hanaya et al. ............. 348/564 |
| 6,567,606 B2 | * | 5/2003 | Milnes et al. ................. 386/83 |
| 6,601,074 B1 | * | 7/2003 | Liebenow ................ 707/104.1 |
| 6,721,955 B2 | * | 4/2004 | Khoo et al. .................... 725/46 |
| 6,792,618 B1 | * | 9/2004 | Bendinelli et al. .......... 725/112 |

OTHER PUBLICATIONS http://www.cbd-hq.com/PDFs/cbdhq_991201ms_xmas.pdf, Mike Sparling, "All I What for Christmass", 1999, pp. 2-4.*
http://www.hometheaterforum.com/files/replay.txt, May 2, 1999.*

* cited by examiner

*Primary Examiner*—Hunter B. Lonsberry
(74) *Attorney, Agent, or Firm*—Lee & Hayes, PLLC (57) ABSTRACT

A television program is received that includes an index that identifies multiple television program segments contained in the television program. The index of program segments is displayed to a television viewer, and the television viewer is allowed to select at least one program segment for recording. The index of program segments can identify the name of each program segment, the time period during which each program segment is transmitted, the program type for each program segment, the content rating for each program segment, or whether the viewer is required to watch a particular program segment. The selected program segments may be recorded on a video recorder. The television viewer is also allowed to select the order of viewing of the program segments.

32 Claims, 9 Drawing Sheets

| Program Segment Name | Time | Program Type | Content Rating |
|---|---|---|---|
| Midwest Storms | +00:30/+01:45 | U.S. News | All |
| President Signs Bill | +01:45/+03:30 | U.S. News | All |
| Nobel Prize Winner | +03:30/+05:15 | World News | All |
| Corporate Merger | +07:15/+09:30 | Business News | All |
| Stock Market Update | +09:30/+12:00 | Business News | All |
| Sports | +15:00/+19:30 | Sports News | All |
| Weather | +22:30/+26:00 | Weather | All |
| Movie Review | +28:00/+29:45 | Movie Review | Mature |

| Program Segment Name | Time | Must Watch? |
|---|---|---|
| Intro/Opening Scene | +00:00/+03:45 | No |
| Commercial 1 | +03:45/+04:45 | No |
| Commercial 2 | +04:45/+05:45 | No |
| Scene 1 | +05:45/+17:00 | No |
| Commercial 3 | +17:00/+17:30 | Yes |
| Commercial 4 | +17:30/+18:30 | Yes |
| Commercial 5 | +18:30/+19:00 | No |
| Scene 2 | +19:00/+24:30 | No |
| Commercial 6 | +24:30/+25:30 | No |
| Commercial 7 | +25:30/+26:30 | Yes |
| Scene 3/End | +26:30/+30:00 | No |

METHOD AND APPARATUS FOR INDEXING VIDEO PROGRAMS

TECHNICAL FIELD

This invention relates to a video indexing system that allows a viewer to selectively view or record portions of a video program.

BACKGROUND

Various systems are available for recording a television program. For example, video cassette recorders (VCRs) allow a user to record and playback television programs. The user of the VCR may watch the television program while it's being recorded and save the recorded program for future viewing. Alternatively, the VCR user may program the VCR to record a television program while the user is away or watching a different television program. The recorded program can then be viewed at a later time.

Another type of video recording device is a digital video recorder (DVR). A DVR may also be referred to as a personal video recorder or a personal television server. A DVR records television programs on a disk drive (or other random access storage device) instead of a video tape. Typically the disk drive is not removable from the recorder and provides greater storage capacity than a conventional VCR video tape. For example, a VCR video tape may provide up to six hours of storage capacity while a DVR may provide twenty or more hours of storage capacity. The DVR can read from and write to virtually any portion of the disk drive in a random manner. This capability allows the DVR to record one television program while simultaneously reading a recorded television program. Additionally, the DVR allows a user to begin viewing a recorded program while the program is still being recorded. For example, the viewer may program the DVR to record a particular television program that is one hour in length. Twenty minutes after the program has started, the viewer begins watching the recorded program from the beginning. While the viewer is watching the beginning of the program, the DVR continues recording the remainder of the program.

Television broadcasts typically include a series of program segments and advertising segments transmitted to a viewer of the broadcast. If the viewer wants to watch a particular portion of a television broadcast, such as the weather portion of a news program, the viewer must either watch the broadcast until the desired portion is displayed or record the entire program and, later, search through the recorded program to locate and view the desired portion. This process is tedious and results in the recording of significant unwanted program information.

The system described herein addresses these and other problems by allowing the viewer to select particular portions of a television broadcast to view and/or record.

SUMMARY

The method and apparatus for indexing video programs described herein provides an indexing mechanism that identifies different portions of a video program, such as a television broadcast. In one implementation, the television broadcaster broadcasts an index for an entire television program at the beginning of the broadcast. For example, if the television broadcast is a pre-recorded program, then the broadcaster already knows the program content and can create an index for the entire program. In another implementation, the broadcaster broadcasts an index at the beginning of each television program segment indicating the content of the following program segment. This implementation is used, for example, when the television program is live and an index of the entire program cannot be generated because the results of the live program are not yet known.

A particular embodiment receives a television program having multiple program segment identifiers associated with multiple television program segments contained in the television program. An index of the television program is generated by combining the multiple program segment identifiers.

In another embodiment, the index of program segments identifies whether the television viewer must watch a particular program segment.

A described feature records the selected program segments and the associated program segment identifiers on a video recorder.

In one embodiment of the system, the television viewer is allowed to select the order of viewing of the program segments.

In another embodiment, an index is retrieved that is associated with a television program. The index identifies multiple television program segments contained in the television program. The retrieved index of program segments is displayed to a television viewer, who is allowed to select at least one television program segment for viewing.

Particular embodiments generate an index identifying multiple television program segments contained in a television program, and broadcast the television program, including the index identifying the multiple television program segments contained in the television program.

Another embodiment includes a television receiver configured to retrieve an index associated with a television program. The index identifies multiple television program segments contained in the television program. The television receiver displays the retrieved index of program segments to a television viewer and allows the viewer to select at least one television program segment for viewing.

DETAILED DESCRIPTION

The method and apparatus for indexing video programs described herein allows the viewer to selectively view or record portions of a video program. Additionally, the viewer may select the order in which different portions of a video program are displayed. Various examples and embodiments are described herein with reference to television programs. However, the systems and procedures described herein can be used with any type of video segment or video program, and are not limited to broadcast television programs. Furthermore, examples contained herein describe the systems and procedures with respect to a television. However, the teachings of the present invention can be applied to any type of display device, such as direct view televisions, projection television systems, and flat panel displays.

Figure 1:
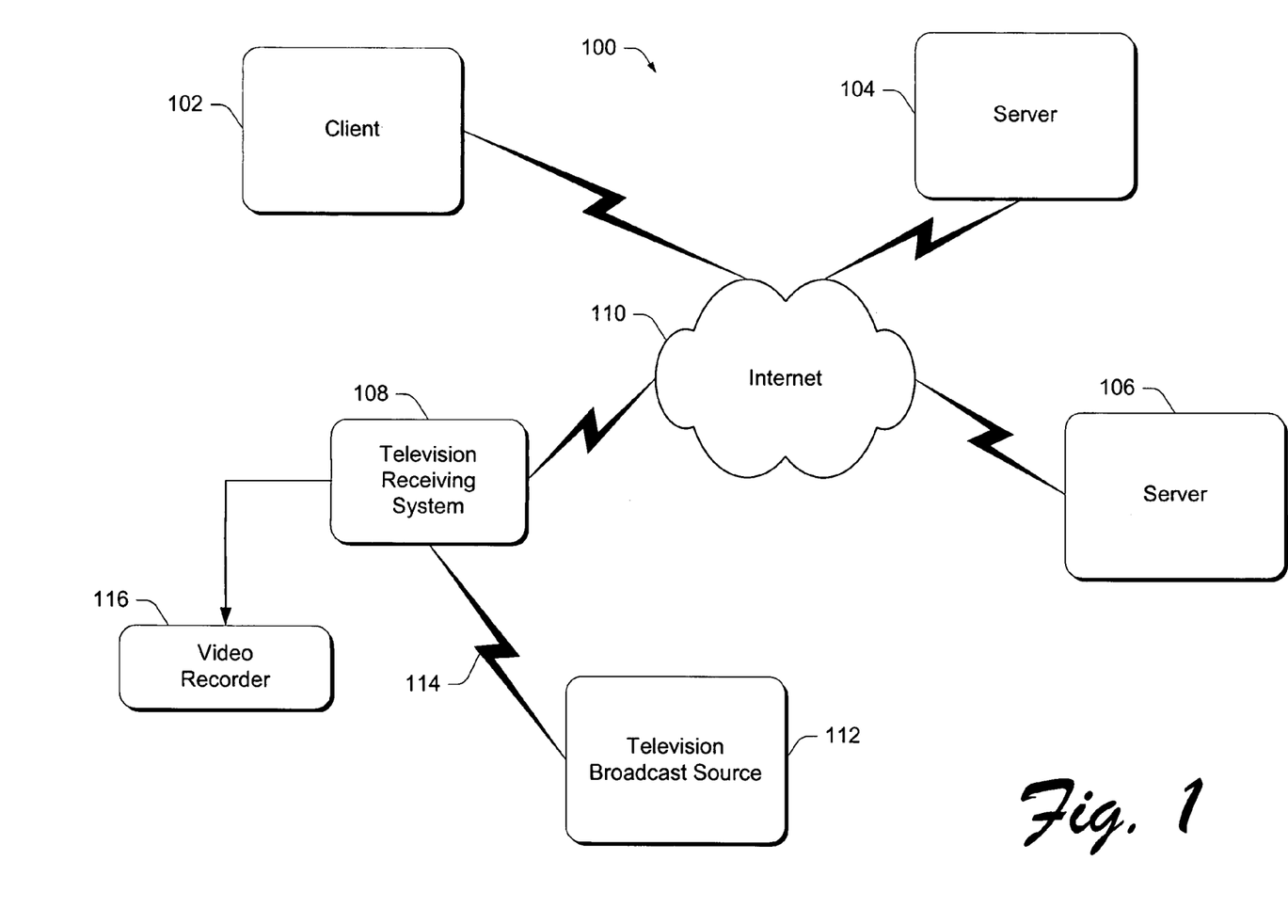
FIG. 1 illustrates an exemplary network environment in which a television receiving system receives and transmits data across the Internet and receives television signals from a television broadcast source.

FIG. 1 illustrates an exemplary network environment 100 in which a television receiving system 108 transmits and receives data across the Internet 110 and receives television signals from a television broadcast source 112. A client 102, servers 104 and 106, and the television receiving system 108 are coupled to one another through the Internet 110. Television receiving system 108 is capable of receiving various types of data from one or more devices coupled to the Internet 110. Television receiving system 108 is also coupled to the television broadcast source 112, which broadcasts television signals via a communication link 114. Television receiving system 108 may receive television signals from source 112 via cable, satellite, microwave, computer network, terrestrial (over the air) broadcast, or any other communication medium. Although not shown in FIG. 1, television broadcast source 112 may have an associated server or other device coupled to the Internet 110, which allows the source 112 to broadcast television signals via one medium (e.g., cable) and transmit other data related to the television broadcast via the Internet 110. Alternatively, television broadcast source 112 may transmit television signals as well as other data related to the television signals via the Internet 110.

Television receiving system 108 is also coupled to a video recorder 116. Video recorder 116 may be any type of recording device capable of recording television signals onto a recordable medium. For example, video recorder 116 can be a VCR or a digital video recorder (DVR). A DVR records television programs or other information onto a disk drive or other random access storage device instead of a video tape. A DVR may also be referred to as a personal video recorder or a personal television server.

Figure 2:
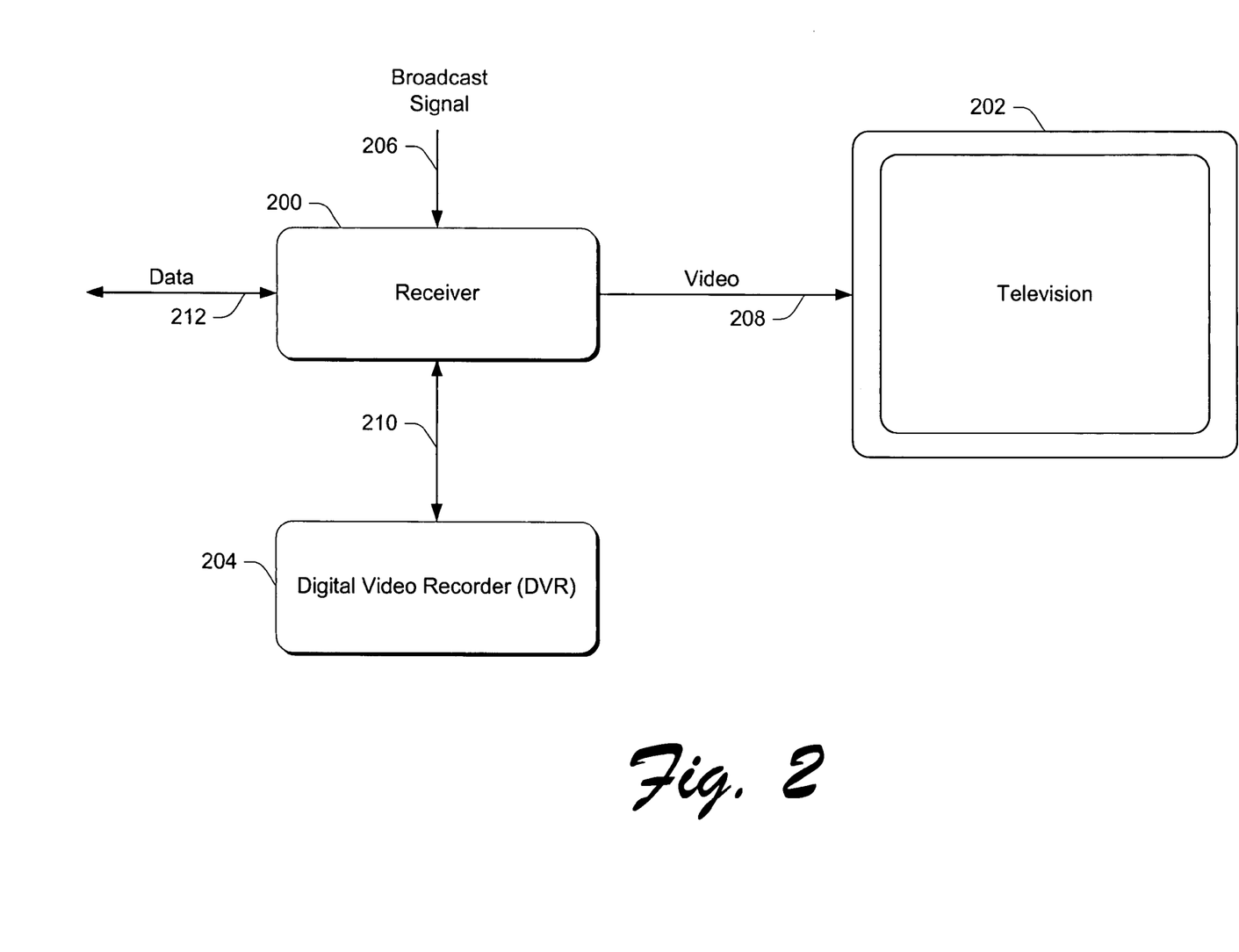
FIG. 2 illustrates an embodiment of a television receiving system.

FIG. 2 illustrates an embodiment of the television receiving system 108. A receiver 200, such as a set-top box, receives a broadcast television signal 206 from a television broadcast source (such as source 112 in FIG. 1). The receiver 200 communicates data bi-directionally on a data communication link 212. Data communication link 212 may use any type of communication medium and any communication protocol. In a particular embodiment, data communication link 212 is a telephone line that provides a data connection to the Internet or another data communication network. Receiver 200 is coupled to a DVR 204, which stores television signals and other data. Receiver 200 is also coupled to a television 202 via a video communication link 208. Video communication link 208 may be a radio frequency (RF), s-video, composite video, component video, or other video link. Television 202 may be any type of display device or projection device using any type of display or projection technology, including projection display systems and flat panel displays. Receiver 200 receives broadcast television signal 206 and displays the received signal on television 202 and/or stores the received signal on DVR 204. Alternatively, receiver 200 may receive television signals via data communication link 212. Furthermore, additional information associated with the received television signal may be received and/or transmitted on data communication link 212. Although receiver 200, television 202, and DVR 204 are shown in FIG. 2 as separate devices, any two or more of these devices may be combined into a single device.

Figure 3:
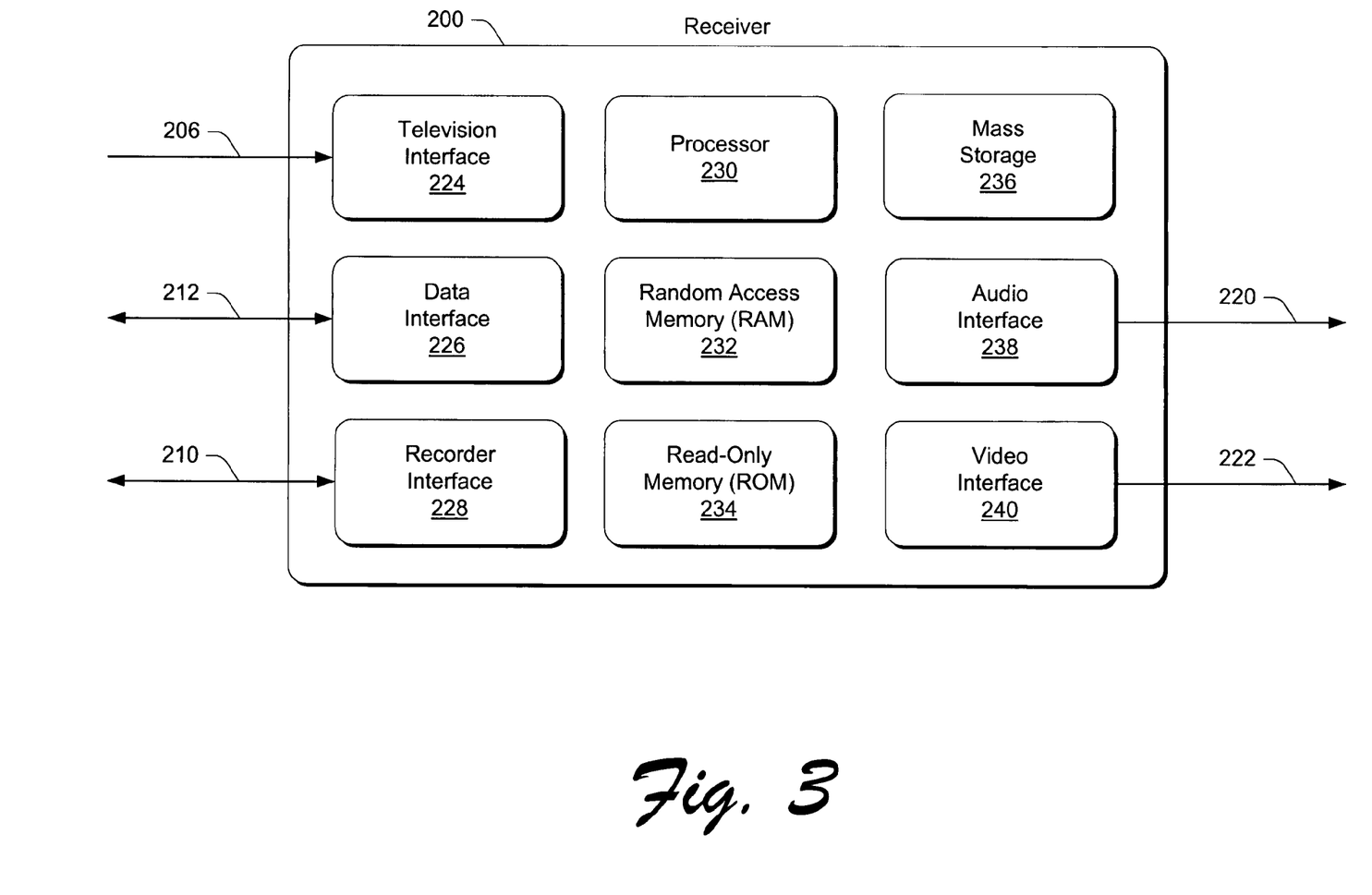
FIG. 3 is a block diagram of a receiver capable of receiving television signals and network data, and generating video signals for display on a television.

FIG. 3 is a block diagram of the receiver 200 shown in FIG. 2. As discussed above, receiver 200 is capable of receiving television signals and network data and generating video signals for display on a television. Additionally, the receiver 200 can be used, for example, to perform various procedures necessary to record and play back television programs and allow a viewer to interact with the source of a television broadcast (e.g., via a data communication network). Receiver 200 includes a television interface 224, such as a television tuner, which receives the broadcast television signal 206 from a television broadcast source. A data interface 226 transmits and receives data across communication link 212, which is typically coupled to a data communication network such as the Internet. Data interface 226 typically includes a modem or other bi-directional data communication device. Receiver 200 also includes a recorder interface 228, which communicates with one or more video recording devices, such as DVR 204 shown in FIG. 2, via communication link 210.

Receiver 200 includes one or more processors 230, a random access memory (RAM) 232, a read-only memory (ROM) 234, and a mass storage device 236. Processor 230 is capable of implementing the various procedures and operations discussed herein. RAM 232 and mass storage device 236 provide for the storage of data, instructions, and other information used by processor 230 during the normal operation of receiver 200. ROM 234 stores various parameters and basic operating instructions used, for example, by processor 230.

An audio interface 238 communicates audio data across an audio communication link 220. Similarly, a video interface 240 communicates video data across a video communication link 222. In a particular embodiment, audio interface 238 and video interface 240 are combined into a single audio/video interface which communicates audio and video information across an audio/video communication link. Although not shown in FIG. 3, receiver 200 may also include a remote control interface that allows a television viewer to control the functions of the receiver using a handheld remote control device.

Generally, the processor 230 of receiver 200 is programmed by means of instructions stored at different times in various computer-readable storage media of the receiver, such as RAM 232 and mass storage 236. The system described herein includes various types of computer-readable storage media when such media contains instructions or programs for implementing the steps described herein in conjunction with a processor. The system also includes the receiver itself when programmed according to the methods and techniques described herein. Alternatively, these systems can be implemented in hardware or a combination of hardware, software, and/or firmware. For example, one or more application specific integrated circuits (ASICs) could be programmed to carry out the systems and procedures discussed herein.

As used herein, a television program is typically defined as a particular television show or event (such as a sporting event or a concert). However, a television program may refer to a portion of an event (e.g., the first hour of a concert or the first part of a multi-part program). A television program may have a known length (such as a movie or a weekly episode of a pre-recorded program) or unknown length, such as a sporting event.

A program segment refers to any temporal portion of a television program. A television program may have any number of program segments. The manner in which a particular television program is divided into program segments is typically determined by the creator or broadcaster of the television program. For example, a baseball game may be divided into a separate program segment for each inning. In other television programs, a program segment may be defined as the portion of the program between two commercial breaks. Commercials and/or commercial breaks may be considered program segments. Additionally, program segments may vary in length within the same television program.

Figure 4:
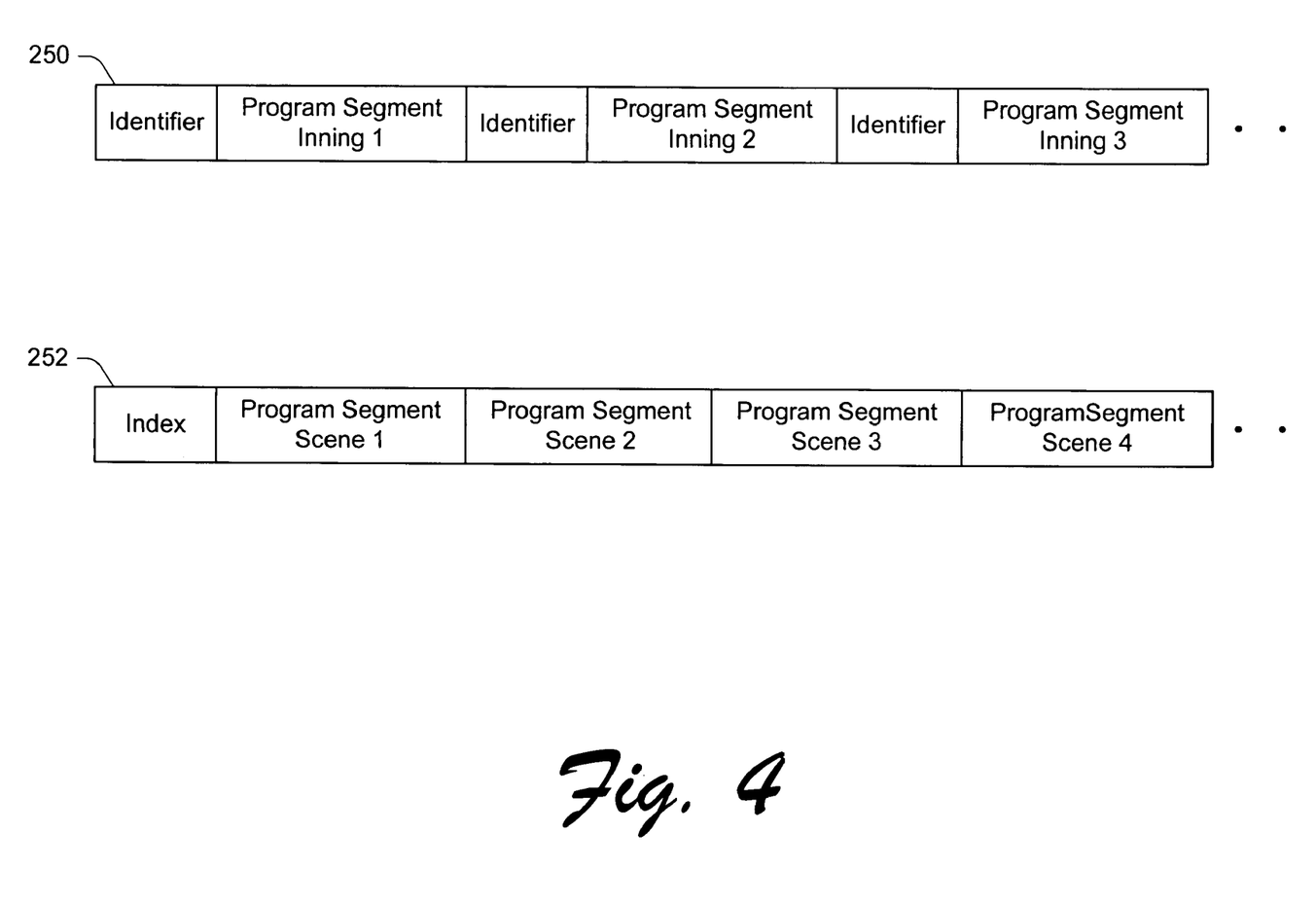
FIG. 4 illustrates two different television broadcasts containing at least one index that identifies television program content.

FIG. 4 illustrates two different television broadcasts 250 and 252, each containing at least one index that identifies television program content. In the television broadcast 250, the broadcaster broadcasts a program segment identifier at the beginning of each program segment indicating the content of the program segment about to be broadcast. This implementation is used, for example, when the program is live (in this example, a baseball game) and an index of the entire program cannot be generated because the results of the live program are not yet known. The index of the entire program is generated after the program broadcast is finished by combining all of the program segment identifiers into a chronological list which identifies all program segments of the broadcast.

In the television broadcast 252, the broadcaster broadcasts an index for an entire program at the beginning of the broadcast. For example, if the broadcast is a pre-recorded program, then the broadcaster already knows the program content and can create an index for the entire program prior to broadcast.

An index may identify one or more program segments in a particular television program. The index in broadcast 252 identifies all program segments whereas each index in broadcast 250 identifies a single program segment. Various types of "labels" may be used to identify characteristics of a particular program segment. Thus, an index that identifies a single program segment may also be referred to as a "label", while an index that identifies multiple program segments can be referred to as an index made up of multiple labels.

Various types of labels can be used to identify the associated program segment. For example,

[label: World News]

identifies a program segment as relating to a World News topic (such as the world news segment of a news program). Another label,

[label: Superbowl Highlights—Scene 2]

identifies the second scene (or second segment) of the television program "Superbowl Highlights." Other labels may contain additional information about the program segment, such as the length of the program segment (in minutes and seconds) or the content rating of the program segment. For example,

[label: Sports News] [time: +22:00/+24:15]

identifies that the sports news segment begins 22 minutes after the start of the program and ends 24 minutes and 15 seconds after the start of the program.

Another example:

[label: Stock Market Update] [time: +20:15/+22:00] [content_rating: All]

identifies the time that the Stock Market Update program segment is broadcast with respect to the beginning of the program and identifies the content rating of the program segment as "All", indicating all audiences. Other types of information relating to the television program segments can be included with the label using the example formats discussed above.

In the example broadcasts 250 and 252 of FIG. 4, the index information is broadcast along with the television program. In alternate embodiments, the index is broadcast separately from the television program or is retrieved by the viewer via a data communication network, such as the Internet. For example, an index of all television programs on a particular channel during a week may be broadcast by a broadcast source and received by a television receiving device. This allows the viewer to select programs and/or program segments for any television show during the week. Alternatively, the viewer may download an index of all television programs on all channels for a particular day, week, or month. For example, a web server may store index information for all upcoming television programs, including program segment information. Thus, the viewer simply downloads the index (e.g., via the Internet) and can access the index repeatedly to select programs or program segments to view or record.

Figure 5:
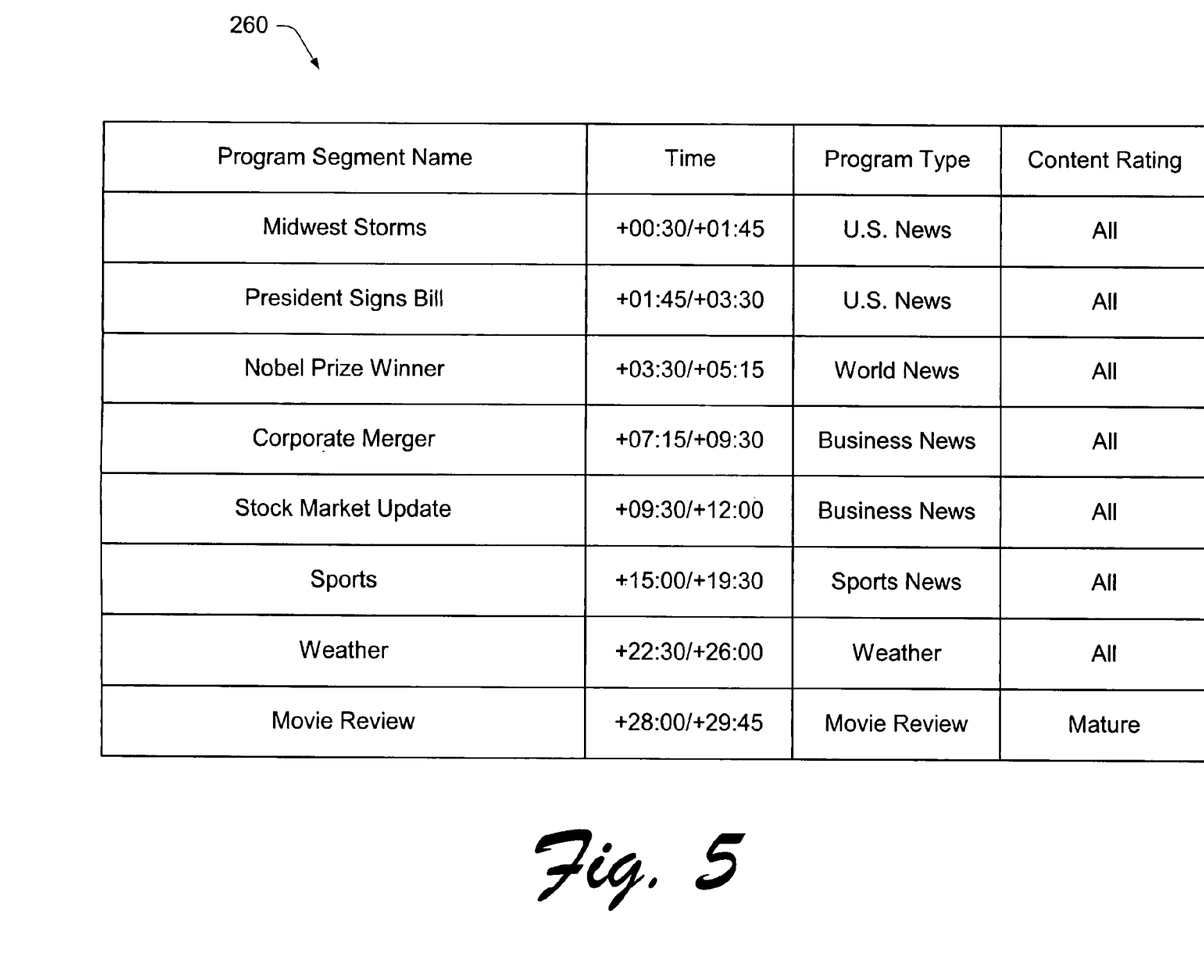
FIG. 5 illustrates an index containing information regarding the various program segments in a television program.

FIG. 5 illustrates an index 260 containing information regarding the various program segments in a television program. All of the information shown in FIG. 5 may be broadcast at the beginning of a pre-recorded television program (e.g., television broadcast 252 in FIG. 4). Alternatively, the various information associated with each program segment may be broadcast prior to the broadcast of each program segment if the program is not pre-recorded (e.g., television broadcast 250 in FIG. 4). The index 260 contains the program segment name, the time that the program segment broadcast begins and ends, the type of program, and the content rating of each program segment. The content rating allows a parent to control the content level of program segments viewed by children. The program type allows a viewer to search through one or more television programs to identify certain types of program segments. For example, a viewer may search through all television programs for a particular week to identify program segments relating to business news. The viewer can then select certain identified program segments for recording on a video recorder. Alternatively, the selected program segments may be downloaded or otherwise retrieved from a server or other mechanism that stores the selected program segments. For example, the viewer may download the program segments from a video server via the Internet or other data communication network.

Index 260 does not identify commercials as program segments. The location of the commercials can be identified by the gaps in the times between program segments. For example, two minutes of commercials occur between the program segment "Nobel Prize Winner" and "Corporate Merger." In alternate embodiments, each commercial or each commercial break is identified in the index as a separate program segment.

Figure 6:
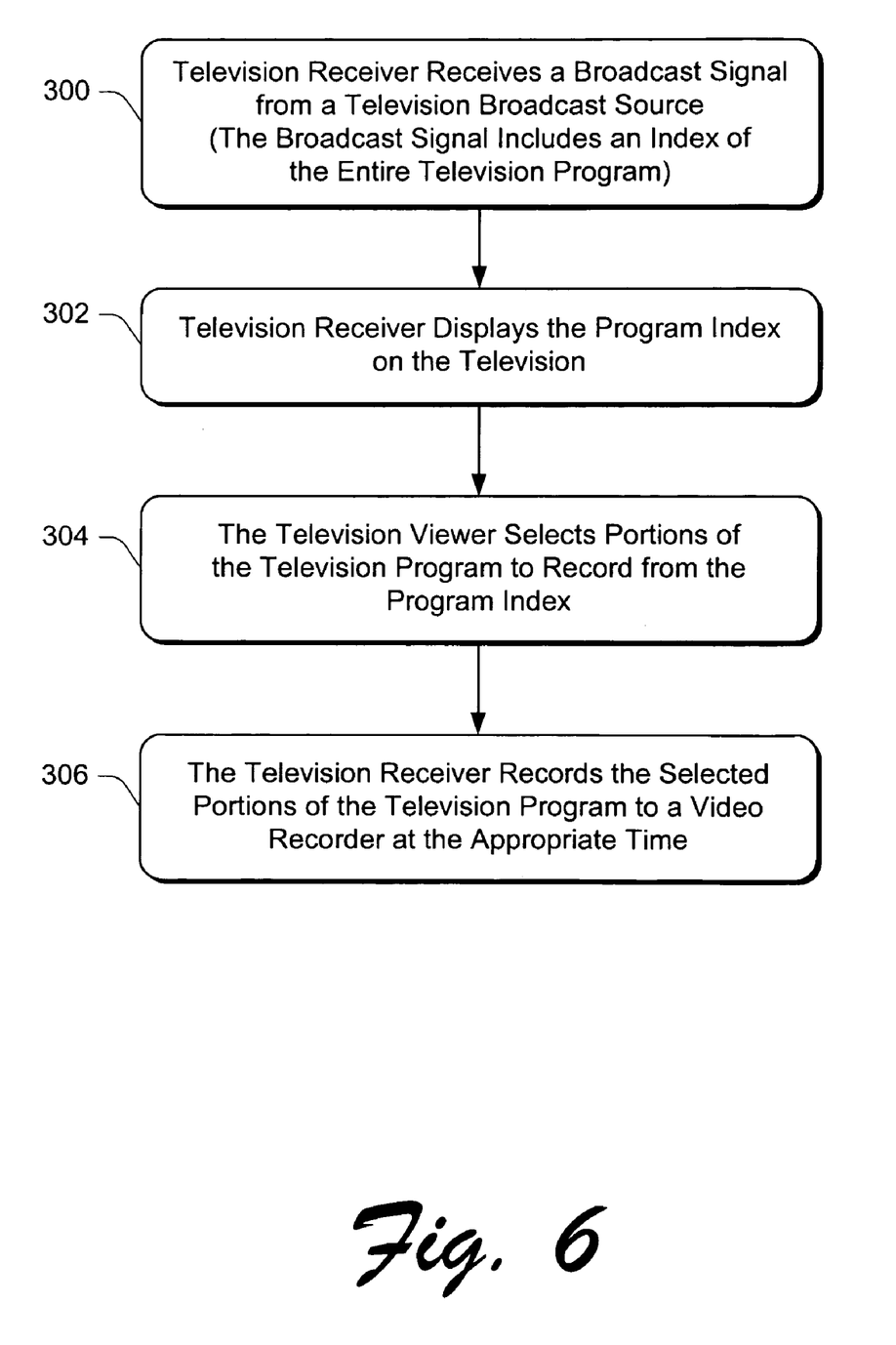
FIG. 6 is a flow diagram illustrating a procedure for receiving and selecting portions of a television program to record based on a program index.

FIG. 6 is a flow diagram illustrating a procedure for receiving and selecting portions of a television program to record based on a program index. A television receiver receives a broadcast signal from a television broadcast source (block 300). The broadcast signal includes an index of the entire television program as well as the television program itself. The index may be of the type illustrated in FIG. 5. The television receiver displays the program index on the television (block 302). The television viewer selects all or portions of the television program to record based on the program index (block 304). For example, the television viewer can select the portions of the television program to record using a remote control device that sends commands to the television receiver. Alternatively, the user can make their selections by using various controls on the television receiver itself. The television receiver records the selected portions of the television program to a video recorder at the appropriate time (block 306). The television receiver knows the appropriate time to record each program segment based on the time information included in the index.

The procedure described above with respect to FIG. 6 is related to recording selected portions of a television program on a video recorder. Alternatively, a similar procedure can be used to select portions of a television program for viewing. In this situation, the selected television programs are downloaded or otherwise retrieved from a video server or other mechanism that stores the selected program segments. Thus, the viewer can select the portions of the program of interest.

In addition to selecting the program segments to record or view, the viewer may select the order in which the segments are recorded or viewed. For example, using the index shown in FIG. 5, the viewer may select to record or view only the "Midwest Storms", "Sports", and "Weather" program segments. Further, the viewer selects to view the "Sports" program segment first, followed by the "Weather" and "Midwest Storms" program segments. In this situation, the program segments are recorded in the order of broadcast, but when the user views the recorded program, the program segments are played back in the order selected by the viewer. If the viewer does not specify a particular order for recording the selected program segments, they can select an order for viewing the segments at the time the recorded program segments are retrieved and played for the viewer.

Figure 7:
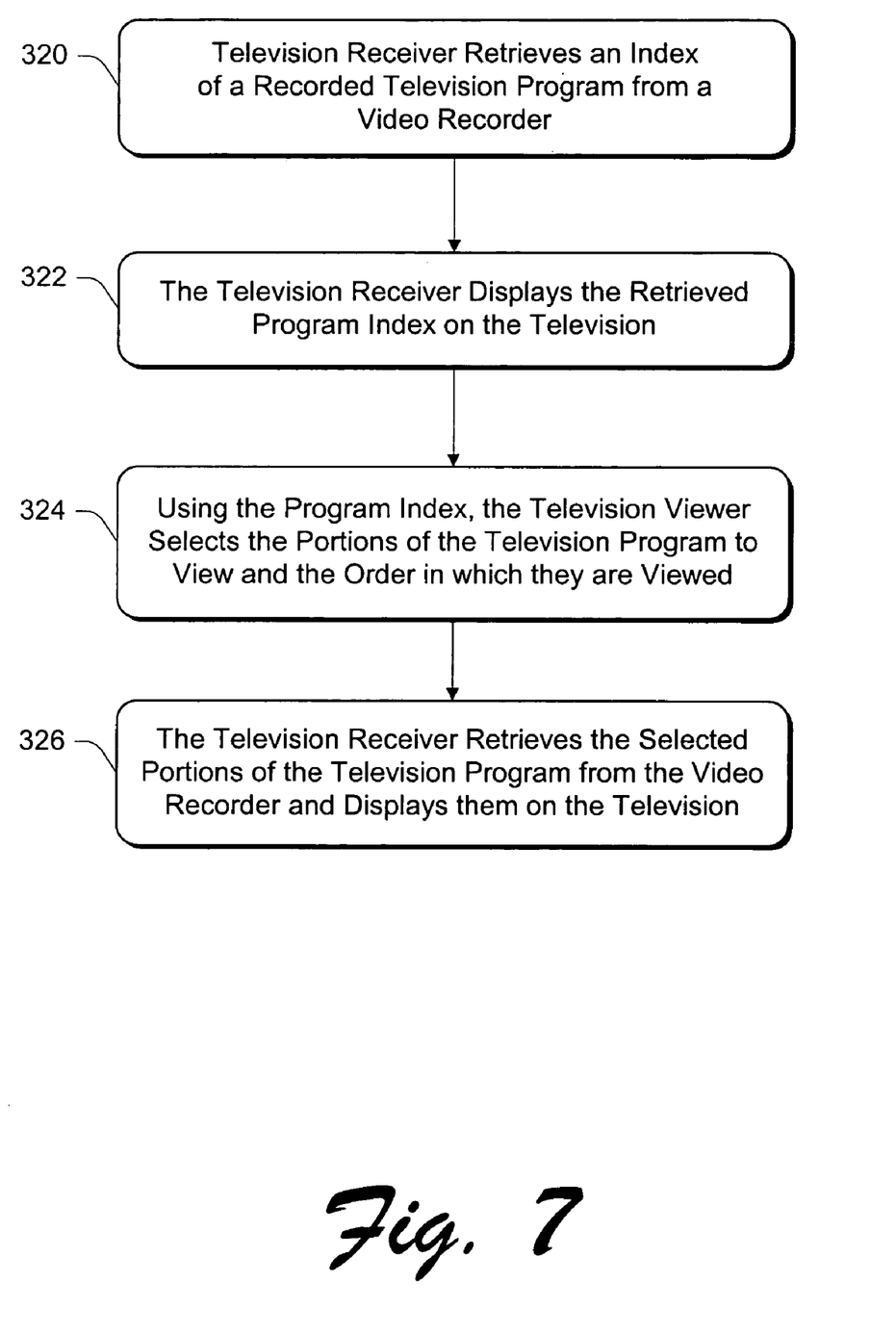
FIG. 7 is a flow diagram illustrating a procedure for viewing portions of a recorded television program based on a program index.

FIG. 7 is a flow diagram illustrating a procedure for viewing portions of a recorded television program based on a program index. A television receiver retrieves an index of a recorded television program from a video recorder (block 320). If a complete index for the television program was broadcast at the beginning of the television program, then the television receiver can read that index from the recorded television program. If a complete index for the television is not available (e.g., a live television broadcast), then the television receiver can create a complete index by reading the various labels broadcast before the start of each program segment.

The television receiver then displays the retrieved program index on the television (block 322). Using the program index, the television viewer selects the portions of the television program to view and the order in which they are viewed (block 324). As discussed above, the viewer may have already selected the order of viewing when selecting the program segments for recording. However, the viewer may choose a different viewing order after recording. The television receiver retrieves the selected portions of the television program from the video recorder and displays them on the television (block 326). When viewing the recorded television program, the viewer may choose to skip to a different portion of the program by displaying the index and selecting the desired program segment. The television receiver then retrieves the selected program segment from the video recorder and displays the program segment on the television.

The broadcast source may designate certain program segments as "must watch." When viewing or playing back a recorded television program, the viewer is prevented from skipping (or "fast-forwarding") past a "must watch" segment of the program. For example, some or all of the commercials in a television program may be designated as "must watch" to prevent the viewer from skipping the commercials or not recording the commercials along with the other program segments.

In a particular embodiment, each "must watch" segment is tied to an adjacent program segment (i.e., the program segment chronologically prior to or chronologically after the "must watch" segment). When the adjacent program segment is viewed, the "must watch" segment must also be viewed—the viewer cannot skip or fast-forward past the "must watch" segment. After the "must watch" segment has been viewed, the viewer can skip to a different program segment.

Figure 8:
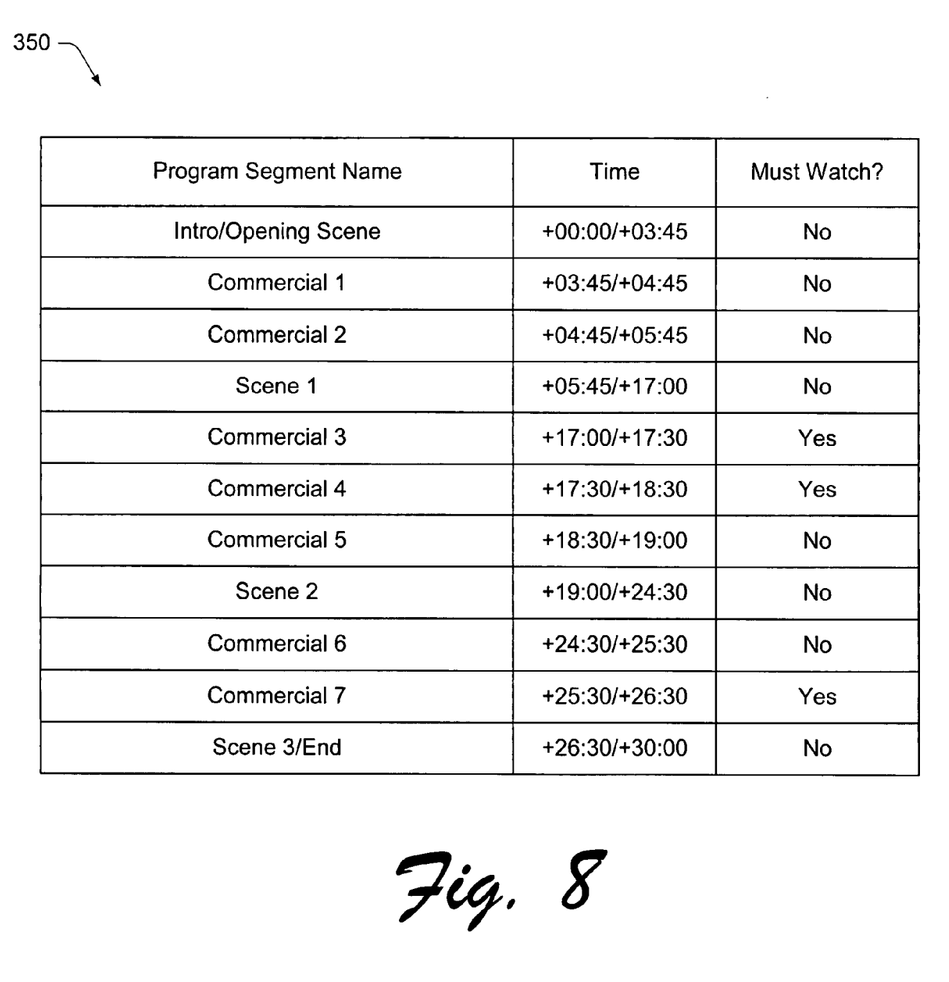
FIG. 8 illustrates an index containing information regarding the various program segments in a television program (including commercials) and indicating whether the viewer is required to watch particular program segments.

FIG. 8 illustrates an index 350 containing information regarding the various program segments in a television program (including commercials) and indicating whether the viewer is required to watch particular program segments. In this example, three of the seven commercials are designated as "must watch" (i.e., Commercial 3, Commercial 4, and Commercial 7). The viewer is prevented from skipping any of those three commercials.

Figure 9:
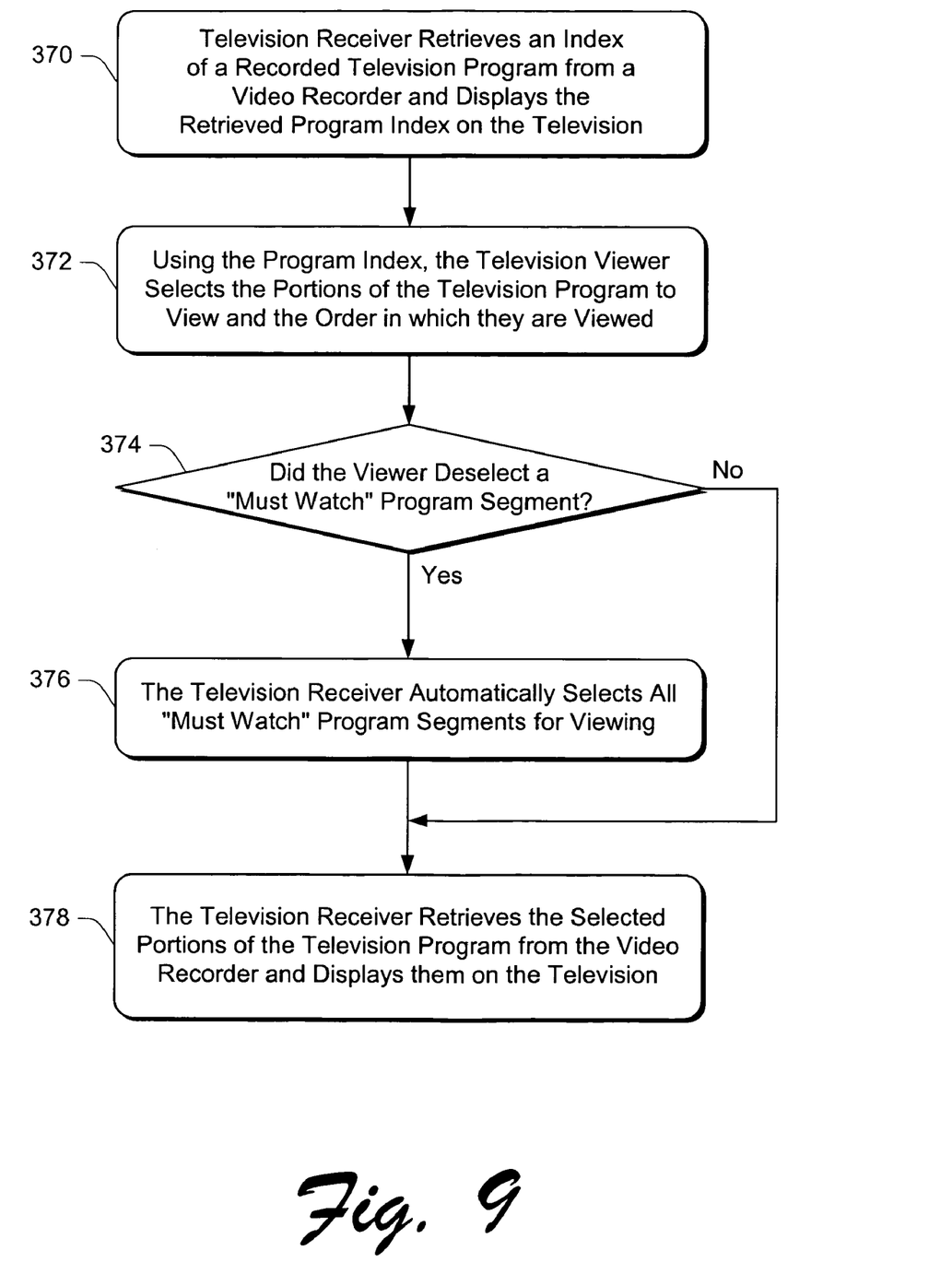
FIG. 9 is a flow diagram illustrating a procedure for viewing a recorded television program in which certain program segments are designated as "must watch."

FIG. 9 is a flow diagram illustrating a procedure for viewing a recorded television program in which certain program segments are designated as "must watch." The television receiver retrieves an index of a recorded television program from a video recorder and displays the retrieved program index on the television (block 370). Using the program index, the television viewer selects the portions of the television program to view and the order in which they are viewed (block 372). Next, the procedure determines whether the viewer deselected (or failed to select) all "must watch" program segments (block 374). If the viewer deselected (or failed to select) any "must watch" program segment, then the television receiver automatically selects all "must watch" program segments for viewing (block 376). The television receiver then retrieves the selected portions of the television program from the video recorder and displays them on the television (block 378).

Similarly, when recording a broadcast television program having certain program segments designated as "must watch", the television receiver ensures that all "must watch" program segments are selected for recording.

Thus, a system has been described that allows a viewer to selectively view or record portions of a video program. Additionally, the viewer may select the order in which different portions of a video program are displayed, with the exception of "must watch" program segments.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
retrieving an index associated with a television program, wherein the index identifies a plurality of television program segments contained in the television program and designates one or more program segments as must watch program segments;
displaying the retrieved index of program segments to a television viewer;
allowing the television viewer to select at least one television program segment for viewing wherein the at least one segment is adjacent to one or more designated must watch program segments; and
when the at least one segment is selected, automatically selecting the adjacent must watch program segments.

2. A method as recited in claim 1 wherein retrieving an index associated with a television program includes storing the index in a digital video recorder and retrieving the index from the digital video recorder.

3. A method as recited in claim 1 wherein a first communication link enables communication between a television receiver and the Internet, such that the index is retrieved via the first communication link.

4. A method as recited in claim 1 wherein retrieving an index associated with a television program includes retrieving the index from a web server.

5. A method as recited in claim 1 wherein the index of program segments identifies the name of each program segment.

6. A method as recited in claim 1 wherein the index of program segments identifies the time period during which each program segment is transmitted.

7. A method as recited in claim 1 further comprising recording the selected program segments on a digital video recorder.

8. A method as recited in claim 7 wherein recording the selected program segments further comprises retrieving the selected program segment from a video server.

9. A method as recited in claim 1 further comprising allowing the television viewer to select the order of viewing of the selected program segments.

10. One or more computer-readable memories containing a computer program that is executable by a processor to perform the method recited in claim 1.

11. A method comprising:
retrieving an index associated with a television program wherein the index identifies a plurality of television program segments contained in the television program and designates one or more program segments as must watch segments, wherein the index and the associated television program are stored on a digital video recorder;
displaying the retrieved index of program segments to a television viewer;
allowing the television viewer to select at least one television program segment for viewing wherein the at least one segment is adjacent to one or more designated must watch program segments;
when the television viewer selects the at least one segment,
determining if the television viewer fails to select any adjacent must watch program segments; and
automatically selecting any non-selected must watch program segments adjacent to the selected segment; and
retrieving the selected program segments and displaying the retrieved program segments on a display device.

12. A method as recited in claim 11 wherein retrieving the index associated with the television program includes retrieving the index from a web server via the Internet.

13. A method as recited in claim 11 wherein retrieving an index includes identifying a plurality of labels contained in the television program.

14. A method as recited in claim 13 wherein at least one of the labels identifies a program segment as a must watch segment and wherein the television viewer is prevented from skipping must watch segments during viewing.

15. A method as recited in claim 11 further comprising allowing the television viewer to select the order of viewing of the program segments.

16. One or more computer-readable memories containing a computer program that is executable by a processor to perform the method recited in claim 11.

17. A method as recited in claim 11 wherein the index indicates a content rating associated with at least one of the video program segments.

18. A method as recited in claim 11 wherein a portion of the index is broadcast prior to the program segment with which the portion of the index is associated.

19. An apparatus comprising a television receiver coupled to a network through a first communication link and configured to retrieve an index associated with a television program via the first communication link, the index identifying a plurality of television program segments contained in the television program and designating one or more program segments as must watch segments, wherein the television program is broadcast via a second communication link, the television receiver further configured to display the retrieved index of program segments to a television viewer and to allow the television viewer to select at least one television program segment for viewing, the television receiver further configured to determine if the television viewer has failed to select any must watch program segments adjacent to a program segment selected by the viewer and to automatically select non-selected must watch program segments adjacent to the selected program segment.

20. An apparatus as recited in claim 19 further comprising a video recorder coupled to the television receiver, the video recorder configured to store the television program and the associated index.

21. An apparatus as recited in claim 19 wherein the television receiver is configured to retrieve the television program via the first communication link.

22. An apparatus as recited in claim 19 wherein the second communication link includes at least one of cable, satellite, microwave, and terrestrial broadcast.

23. An apparatus as recited in claim 19 wherein the television receiver is further to allow the television viewer to select the order of viewing of the program segments.

24. An apparatus comprising:
a television receiver to receive a television program via a television broadcast communication link and to retrieve an index identifying a plurality of television program segments contained in the television program via a data communication link separate from the television broadcast communication link, the index further identifying one or more program segments as must watch segments;
a display device coupled to the television receiver to display the index of program segments to a television viewer and to allow the television viewer to select at least one television program segment for viewing, the television receiver configured to determine if the television viewer has failed to select a must watch program segment adjacent to a program segment selected by the television viewer and to automatically select the non-selected must watch program segment; and a digital video recorder coupled to the television receiver to record selected program segments.

25. An apparatus as recited in claim 24 wherein the television viewer is prevented from skipping must watch segments during viewing.

26. An apparatus as recited in claim 24 wherein the data communication link enables the television receiver to communicate via the Internet.

27. One or more computer-readable media having stored thereon a computer program that, when executed by one or more processors, causes the one or more processors to:

retrieve an index associated with a television program via a first communication link, wherein the index identifies a plurality of television program segments contained in the television program and designates one or more program segments as must watch segments, the television program broadcast via a second communication link;

display the retrieved index of program segments to a television viewer;

allow the television viewer to select at least one television program segment for viewing, wherein the at least one television program segment is adjacent to one or more designated must watch program segments; and when the at least one television program segment is selected:

determine if the television viewer fails to select adjacent must watch program segments; and automatically select the adjacent must watch program segments.

28. One or more computer-readable media as recited in claim 27 further comprising receiving selected television program segments via the second communication link.

29. One or more computer-readable media as recited in claim 27 wherein the first communication link is associated with the Internet.

30. An apparatus comprising:

means for retrieving an index associated with a television program via a bi-directional data communication link;

means for receiving the television program via a video communication link;

means for determining a plurality of television program segments contained in the television program;

means for displaying the retrieved index of program segments to a viewer; and means for allowing the viewer to select at least one television program segment for viewing wherein the at least one television program segment is adjacent to one or more designated must watch program segments; and when the at least one television program segment is selected, means for automatically selecting non-selected must watch program segments adjacent to the selected television program segment.

31. The apparatus as recited in claim 30, further comprising means for retrieving the index from the Internet and means for storing the index in a digital video recorder.

32. The apparatus as recited in claim 30, further comprising means for preventing the viewer from skipping must watch program segments.

\* \* \* \* \*